United States Patent [19]

Isayama

[11] 4,293,867
[45] Oct. 6, 1981

[54] DEVICE FOR REMOVING AIR BUBBLES FORMED AND TRAPPED IN INK CHAMBER OF PRINT HEAD OF INK-JET PRINTER

[75] Inventor: Takuro Isayama, Tokyo, Japan

[73] Assignee: Ricoh Co., Ltd., Tokyo, Japan

[21] Appl. No.: 147,277

[22] Filed: May 6, 1980

[30] Foreign Application Priority Data

May 14, 1979 [JP] Japan .................................. 54-58025

[51] Int. Cl.³ ............................................ G01D 15/18
[52] U.S. Cl. ................................................ 346/140 R
[58] Field of Search .................................. 346/75, 140

[56] References Cited

U.S. PATENT DOCUMENTS

| 4,050,078 | 9/1977 | Isayama et al. | 346/140 IJ |
| 4,123,761 | 10/1978 | Kimura et al. | 346/140 PD |
| 4,148,041 | 4/1979 | Rosenstock | 346/140 PD |
| 4,183,029 | 1/1980 | Isayama et al. | 346/140 IJ |

*Primary Examiner*—George H. Miller, Jr.
*Attorney, Agent, or Firm*—Burgess, Ryan & Wayne

[57] ABSTRACT

A device for removing air bubbles formed and trapped in an ink chamber of an ink-jet print head, said device comprising a means for sensing the existance of air bubbles in the ink chamber, a means responsive to the output signal from the sensing means for replacing the ink in the ink chamber with an agent having a low surface tension, and a means for replacing the agent filled in the ink chamber with the ink.

1 Claim, 5 Drawing Figures

DEVICE FOR REMOVING AIR BUBBLES FORMED AND TRAPPED IN INK CHAMBER OF PRINT HEAD OF INK-JET PRINTER

BACKGROUND OF THE INVENTION

The present invention relates to generally an ink-jet printer and more particularly a device for removing air bubbles formed and trapped in an ink chamber of a print head thereof.

When air bubbles are formed and trapped in an ink chamber of a print head by any cause, the operation of issuing a continuous jet of ink and breaking it up into a stream of ink drops is considerably adversely affected. In the worst case, the ink drop generator cannot generate the ink drops at all. In order to overcome this problem, there have been devised and demonstrated various means, but all of them have been found unsatisfactory in practice. Once air bubbles are formed and trapped in the ink chamber, it is extremely difficult to remove them completely.

SUMMARY OF THE INVENTION

The primary object of the present invention is therefore to provide a device for readily and completely removing air bubbles from the ink chamber of an ink-jet print head.

According to one preferred embodiment of the present invention a means is provided which senses whether or not air bubbles are formed and trapped in the ink chamber of an ink drop generator. In response to the output signal from the sensor means, the ink in the ink chamber is completely drawn and replaced with an agent having a low surface tension. Since air bubbles will not mix with a liquid with a low surface tension, any air bubbles in the ink chamber can be completely removed. Thereafter the agent is replaced with the ink. These sequential operations can be automatically accomplished once manually started.

The above and other objects, effects, features and advantages of the present invention will become more apparent from the following description of a preferred embodiment thereof taken in conjunction with the accompanying drawings.

DESCRIPTION OF THE PREFERRED EMBODIMENT

Figure 1:
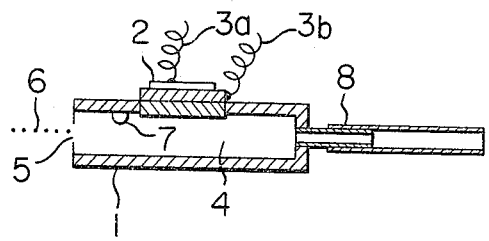
FIG. 1 is a longitudinal sectional view of an ink-jet print head to which is applied the present invention.

In FIG. 1 is shown an ink-jet print head comprising an ink drop generator 1 having a piezoelectric crystal or the like 2 mounted on one wall of an ink chamber 4 and electrically connected through lead wires $3a$ and $3b$ to a synchronizing signal generator or drive circuit (not shown) and an orifice or nozzle 5. In response to a periodic pressure variation applied to the ink in the ink chamber 4 by the piezoelectric crystal or the like 2, a continuous jet of ink issues through the nozzle 5 and breaks up into a stream of ink drops 6 which are deposited on a recording paper or the like (not shown). Sometimes air bubble 7 is formed in the ink chamber 4 which is supplied with the ink through an ink supply line 8.

Figure 2:
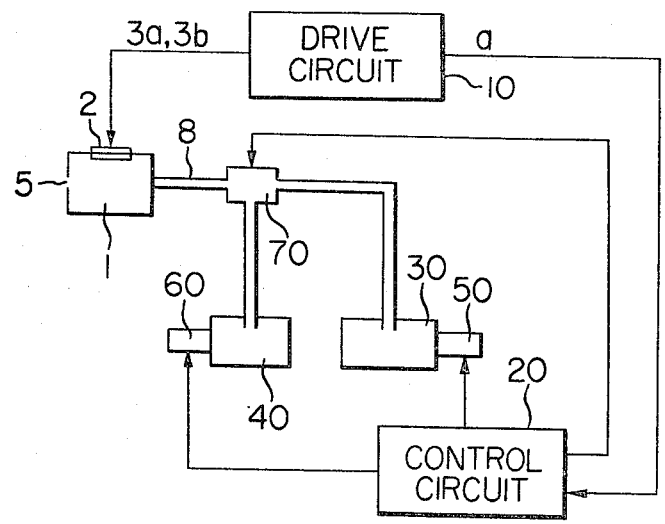
FIG. 2 is a block diagram of an ink supply system and a device or system for expelling air bubbles out of the ink chamber.
Figure 3:
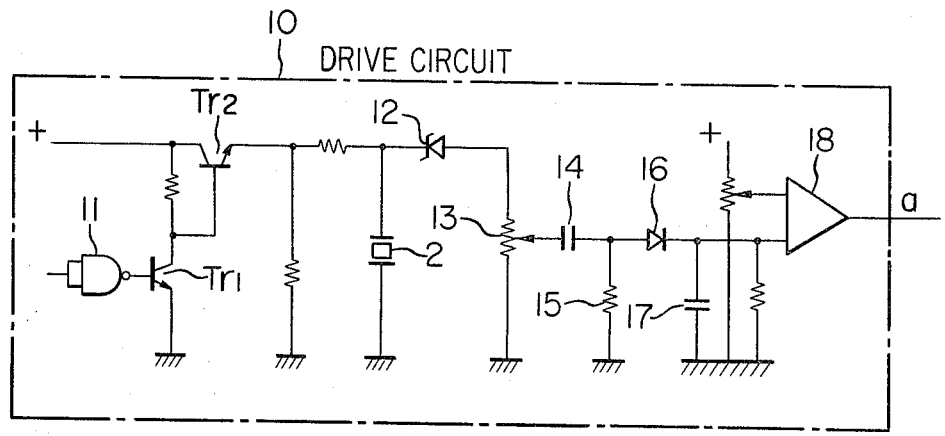
FIG. 3 is a circuit diagram of a drive-and-sensor circuit 10 shown in FIG. 2.

Referring to FIG. 2, the piezoelectric crystal or the like 2 is connected through wires $3a$ and $3b$ to a drive circuit 10 having a dual function of driving the piezoelectric crystal 2 and detecting whether or not an air bubble 7 is formed in the ink chamber 4. That is, as shown in FIG. 3, normally a pulse voltage with a predetermined pulse width is applied to a NAND gate 11 so that a transistor $Tr_1$ is turned off while a transistor $Tr_2$ is turned on to apply a high voltage pulse to the piezoelectric crystal or the like 2. In this case, in response to a control signal from a control circuit 20, a solenoid-controlled valve 70 communicates an ink tank or reservoir 30 with the ink drop generator 1 or ink chamber 4.

When an air bubble is formed in the ink chamber 4, the mechanical impedance of the ink chamber 4 looking from the piezoelectric crystal or the like 2 changes. As a result, the voltage across the piezoelectric crystal or the like 2 becomes in the form of a pulse voltage obtained by the superposition of the driving pulse voltage and voltages because of vibration of the printer. This superposed voltage is applied through a zener diode 12, which removes a voltage component corresponding to the driving pulse voltage, a potentiometer 13, a filter consisting of a capacitor 114 and a resistor 15 and a rectifier consisting of a diode 16 and a capacitor 17, to one input terminal of a voltage comparator 18. A reference voltage is applied to the other input terminal of the comparator 18. When the air bubble 7 exists in the ink chamber 4, then the output voltage of the comparator 18 rises to a high level as indicated at A in FIG. 5, whereby the presence of the air bubble 7 can be detected.

In response to the detection of the air bubble 7; that is, in response to the high-level output a from the drive and sensor circuit 10, the control circuit 20 accomplishes a sequence of operations to be described below in order to remove the air bubble 7.

Figure 4:
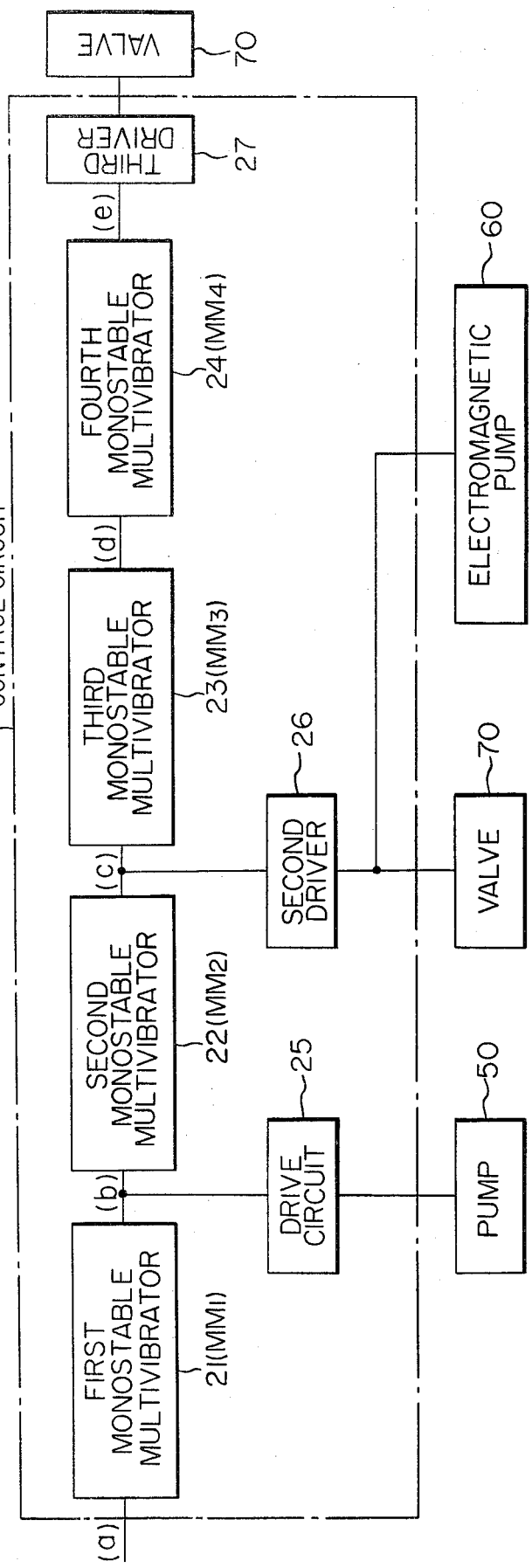
FIG. 4 is a block diagram of a control circuit 20 shown in FIG. 2.
Figure 5:
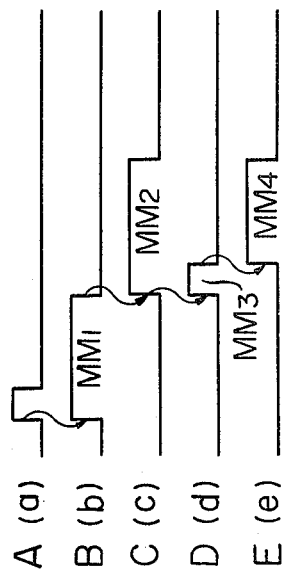
FIG. 5 is a timing chart used for the explanation of the mode of operation of the device for removing air bubbles.

Referring to FIG. 4 and FIG. 5, in response to the high-level voltage signal a from the drive and sensor circuit 10, a first monostable multi-vibrator 21 gives a high level signal b (See FIG. 5B) to a drive circuit 25 which in turns drives an electromagnetic pump 50 so as to draw the ink in a predetermined quantity from the ink chamber 4 in such a way that the level of the ink is maintained in the solenoid-controlled valve 70.

The air bubble is in general in contact with the upper wall of the ink chamber 4 because of its buoyancy and is entrained by the ink flowing out of the ink chamber 4 when the ink is drawn in the manner described above.

When the output signal from the first monostable multivibrator 21 falls to a low level, a second monostable multivibrator 22 gives a high-level signal c (See FIG. 5C) to a second driver 26 which in turn drives the valve 70 so that the ink reservoir 30 is cut off from the ink chamber 4 while a reservoir 40 containing an air-bubble expelling liquid is communication with the ink chamber. At the same time an electromagnetic pump 60 is driven so as to charge the air-bubble expelling liquid such as a primary alcohol into the ink chamber. The air-bubble expelling agent must have a low surface tension and a low viscosity so that it can completely fill the ink chamber 4 and entrain any air bubbles when discharged.

When the output signal of the second monostable multivibrator 23 falls to a low level, a third monostable multivibrator 23 delivers a high-level output signal d for a predetermined time (See FIG. 5D). After the output signal of the third multivibrator 23 falls to a low level, a fourth monostable multivibrator 24 delivers a high-level output signal e (See FIG. 5E) to a third driver 27 which in turns drives the control valve 70 so that the ink reservoir 30 is communicated again with the ink chamber while the air-bubble expelling agent reservoir 40 is cut off from the ink chamber 4. Thereafter the air-bubble expelling agent is discharged through the nozzle 5 from the ink chamber 4 by driving the piezoelectric crystal or the like 2 or by the energy stored in the pump 50 or more particularly in a spring or the like when the pump 50 is driven in order to draw the ink from the ink chamber 4, this stored energy restoring the pump 50 to its initial position. Thus the ink chamber 4 is filled again with the ink.

As described above, the air bubbles formed and trapped in the ink chamber 4 can be completely removed by the device of the present invention which is very simple in construction yet highly reliable and dependable in operation and is inexpensive.

What is claimed is:

1. A device for removing air bubbles formed and trapped in an ink chamber of a print head of an ink-jet printer comprising
   (a) a means for detecting the existence of air bubbles in said ink chamber,
   (b) a means responsive to the output signal from said detection means for replacing the ink in the ink chamber with a liquid with a small surface tension and a low viscosity, and
   (c) a means for replacing said liquid in said ink chamber with the ink.

* * * * *

UNITED STATES PATENT AND TRADEMARK OFFICE
CERTIFICATE OF CORRECTION

PATENT NO. : 4,293,867
DATED : October 6, 1981
INVENTOR(S) : Takuro Isayama

It is certified that error appears in the above—identified patent and that said Letters Patent is hereby corrected as shown below:

Title Page: In the Abstract, line 3 : "existance"

should be --existence--

Column 2, line 31: "114" should be --14-- line 63: "communication" should be

--communicated--

Signed and Sealed this

Tenth Day of August 1982

[SEAL]

Attest:

Attesting Officer

GERALD J. MOSSINGHOFF

Commissioner of Patents and Trademarks